(12) United States Patent
Santucci (10) Patent No.: US 10,550,596 B2
(45) Date of Patent: Feb. 4, 2020

(54) SUPPORT TOWER, PARTICULARLY FOR A WIND TURBINE

(71) Applicant: MICOPERI ENERGIA S.R.L., Ortona CH (IT)

(72) Inventor: Romeo Santucci, Ortona (IT)

(73) Assignee: MICOPERI ENERGIA S.R.L., Ortona, CH (IT)

( * ) Notice: Subject to any disclaimer, the term of this patent is extended or adjusted under 35 U.S.C. 154(b) by 91 days.

(21) Appl. No.: 15/323,388

(22) PCT Filed: Jun. 19, 2015

(86) PCT No.: PCT/IT2015/000159
§ 371 (c)(1),
(2) Date: Dec. 30, 2016

(87) PCT Pub. No.: WO2016/001942
PCT Pub. Date: Jan. 7, 2016

(65) Prior Publication Data
US 2017/0152672 A1 Jun. 1, 2017

(30) Foreign Application Priority Data
Jul. 1, 2014 (IT) .............................. RM2014A0348

(51) Int. Cl.
*E04H 12/18* (2006.01)
*F16B 7/14* (2006.01)
(Continued)

(52) U.S. Cl.
CPC ........... *E04H 12/182* (2013.01); *E04H 12/34* (2013.01); *F03D 13/20* (2016.05); *F16B 7/1463* (2013.01);
(Continued)

(58) Field of Classification Search
CPC ..... E04H 12/182; E04H 12/34; E04H 12/085; F16B 7/1463; F16B 7/1472
See application file for complete search history.

(56) References Cited

U.S. PATENT DOCUMENTS 2,795,303 A * 6/1957 Muehlhause ......... E04H 12/182
52/121
3,103,375 A * 9/1963 McMullin ............. E04H 12/182
248/188.5
(Continued)

FOREIGN PATENT DOCUMENTS

CH 399692 9/1965
JP 2002308593 A * 10/2002
(Continued)

*Primary Examiner* — Joshua J Michener
*Assistant Examiner* — Charissa Ahmad
(74) *Attorney, Agent, or Firm* — Muncy, Geissler, Olds & Lowe, P.C.

(57) ABSTRACT

A support tower, particularly for a wind turbine. The support tower has at least a first elongated component which is internally hollow and at least a second elongated component which is slidably coupled to the at least a first elongated component and movable relative to the at least a first elongated component at least between a retracted position. The second elongated component is at least partially inserted in the at least a first elongated component, and an extracted position, where the at least a second elongated component is substantially extracted from the at least a first elongated component. A moving device for moving the second elongated component from the retracted position to the extracted position, and vice versa, and a blocking device configured to allow the at least a second elongated component to be blocked in the extracted position, are also provided.

3 Claims, 9 Drawing Sheets

(51) Int. Cl.
*F03D 13/20* (2016.01)
*E04H 12/34* (2006.01)
*E04H 12/08* (2006.01)

(52) U.S. Cl.
CPC .......... *F16B 7/1472* (2013.01); *E04H 12/085* (2013.01); *F05B 2240/912* (2013.01); *F05B 2240/9151* (2013.01)

(56) References Cited

U.S. PATENT DOCUMENTS

| | | | | |
|---|---|---|---|---|
| 3,147,829 | A * | 9/1964 | Johnson | E04H 12/182 403/365 |
| 3,248,831 | A * | 5/1966 | Jones | E04H 12/182 29/897.33 |
| 3,328,921 | A * | 7/1967 | Keslin | E04H 12/182 52/121 |
| 3,468,398 | A * | 9/1969 | Galloway | B66F 3/28 182/141 |
| 3,474,833 | A * | 10/1969 | Garrette, Jr. | F16B 7/105 138/120 |
| 3,638,806 | A * | 2/1972 | Hippach | B66C 23/703 212/231 |
| 3,792,554 | A * | 2/1974 | Archer | E04H 12/12 182/189 |
| 3,887,155 | A * | 6/1975 | Bertalot | F16B 7/10 248/333 |
| 4,062,156 | A * | 12/1977 | Roth | B64G 1/22 343/883 |
| 4,079,978 | A * | 3/1978 | McMullin | F16B 7/105 15/3.51 |
| 4,176,360 | A * | 11/1979 | Leavy | H01Q 1/10 343/880 |
| 4,337,601 | A * | 7/1982 | Vaerk | B66C 23/701 212/347 |
| 4,357,785 | A * | 11/1982 | Eklund | E04H 12/182 212/350 |
| 4,385,849 | A * | 5/1983 | Crain | F16B 7/105 343/901 |
| 4,580,377 | A * | 4/1986 | Sundin | E04H 12/182 254/400 |
| 4,785,309 | A * | 11/1988 | Gremillion | H01Q 1/1235 343/883 |
| 4,918,896 | A * | 4/1990 | Wiese | E04H 12/182 52/632 |
| 4,932,176 | A * | 6/1990 | Roberts | E04H 12/182 182/148 |
| 5,101,215 | A * | 3/1992 | Creaser, Jr. | E04H 12/182 343/883 |
| 5,315,795 | A * | 5/1994 | Chae | B66F 11/00 343/874 |
| 5,660,495 | A * | 8/1997 | Atsukawa | F16B 7/10 248/405 |
| 6,046,706 | A * | 4/2000 | Vargas | H01Q 1/1235 343/880 |
| 6,719,257 | B1 * | 4/2004 | Greene | F16B 7/1418 248/161 |
| 6,782,667 | B2 * | 8/2004 | Henderson | E04H 12/182 52/116 |
| 8,381,460 | B1 | 2/2013 | McDermott | |
| 8,522,511 | B2 * | 9/2013 | Thoren | E04H 12/182 52/118 |
| 9,371,663 | B2 * | 6/2016 | Pereira | E04H 12/085 |
| 2008/0156962 | A1 * | 7/2008 | Chen | A47B 9/14 248/653 |
| 2008/0236060 | A1 * | 10/2008 | Battaglia | E04H 12/182 52/121 |
| 2010/0119578 | A1 * | 5/2010 | To | A61L 31/10 424/423 |
| 2011/0138721 | A1 * | 6/2011 | Bagepalli | E02D 27/42 52/299 |
| 2011/0314767 | A1 * | 12/2011 | Gee | E04H 12/34 52/745.17 |
| 2013/0091784 | A1 * | 4/2013 | Schmidt | E04H 12/182 52/115 |
| 2013/0239490 | A1 * | 9/2013 | Peng | E04B 1/34305 52/111 |
| 2015/0050070 | A1 * | 2/2015 | Dykes | H01Q 1/1235 403/109.2 |
| 2015/0322687 | A1 * | 11/2015 | Pereira | E04H 12/182 52/849 |
| 2016/0301128 | A1 * | 10/2016 | Blackwelder | H01Q 1/32 |

FOREIGN PATENT DOCUMENTS

WO    WO 2011025520 A1 *   3/2011
WO    WO 2012007306 A2 *   1/2012
WO    WO-2014/037014 A1    3/2014

* cited by examiner

SUPPORT TOWER, PARTICULARLY FOR A WIND TURBINE

BACKGROUND OF THE INVENTION

Field of the Invention

The present invention relates to a support tower, particularly for a wind turbine.

More specifically, the invention concerns a support tower, particularly for an offshore wind turbine.

Support tower suggested according to the invention can be in any case conveniently used to support also different very heavy apparatuses different from a wind generator, to be installed offshore at a set height with respect to the sea level, such as a military monitoring unit, or a power generator.

Brief Discussion of the Related Art

In the following, the specification will be addressed to the installation of an offshore wind generator, but it is well evident that the same must not be considered limited to this specific application, being the same support tower applicable also to any kind of wind system, or for ground wind systems.

Growing needing of obtaining always bigger outlet power from wind generators requires the use of blades having remarkable dimensions and weight, and consequently support structures, or support towers that are resistant and obviously higher than the blade length.

Installation offshore of wind systems with large power therefore requires handling and use of cranes and large other lifting means that can lift and place in the proper position towers realised to sustain wind generators and their blades.

Standard techniques for installation offshore of wind systems—i.e. wind turbines—provided, after the installation of the foundation structure on ocean floor and transportation of support tower to the installation site, overturning of the latter from a horizontal position, corresponding to the position in which it is transported, to the vertical operative position.

Said method for installing a wind tower requires the use of a ship provided with a crane having a loading arm longer than the height of the tower to be installed, in order to permit vertical positioning of the latter.

Further, to install a traditional wind tower under safety conditions, it is necessary, before relevant overturning, perfectly stabilizing the ship provided with the lifting crane with respect to sea surface.

The use of the above mentioned operative means to install traditional wind towers is however particularly expensive and strongly influenced by weather—climatic conditions.

For example, it is noted that rental of a ship provided with a crane to install a traditional wind tower of about 120 m height involves the payment of many thousands of Euros.

Therefore, taking into consideration very high installation costs by presently available technologies, it is often considered not convenient installing offshore a large power wind system, since economic advantages deriving from the same would be strongly limited by high costs for its installation.

SUMMARY OF THE INVENTION

On the contrary, support tower suggested according to the present invention has such structural and functional features not requiring for its installation in situ the use of a ship provided with a crane or with other large lifting means.

In view of the above, it is therefore object of the present invention that of providing a support tower, particularly for a wind turbine, that can support a wind generator, or a shuttle having a large output power, or a different heavy apparatus.

Another object of the present invention is that of providing a support tower, particularly for a wind turbine, permitting its installation without the use of outer lifting and positioning means.

A further object of the invention is that of providing a support tower, particularly for a wind turbine, that can be manufactured, transported and installed in situ with low expenses.

Another object of the present invention is that of providing a support tower, particularly for a wind turbine, that can be installed quickly.

It is therefore specific object of the present invention a support tower, particularly for a wind turbine, wherein said support tower comprises: at least a first elongated component, which is internally hollow; at least a second elongated component, which is slidably coupled to said at least a first elongated component and movable relative to said at least a first elongated component at least between a retracted position, where said second elongated component is at least partially inserted in said at least a first elongated component, and an extracted position, where said at least a second elongated component is substantially extracted from said at least a first elongated component; moving means for moving said second elongated component from said retracted position to said extracted position, and vice versa; and blocking means configured to allow said at least a second elongated component to be blocked in said extracted position.

Preferably, according said blocking means comprise a plurality of pins arranged between said at least a first elongated component and said at least a second elongated component and selectively movable between a disengagement position, wherein said at least a second elongated component is movable relative to said at least a first elongated component, and an engagement position, wherein said at least a second elongated component is fixed relative to said at least a first elongated component.

Advantageously, according to the invention, said support tower can comprise longitudinal guide means for guiding motion of said at least a second elongated component between said retracted position and said extracted position and for preventing reciprocal rotation of said at least a second elongated component and said at least a first elongated component.

Furthermore, according to the invention, said moving means can comprise at least one lifting device comprising: a first coupling member, which is slidably connected with said longitudinal guide means and selectively fixable to said longitudinal guide means; a second coupling member, which is connected with said at least a second elongated component and slidably connected with said longitudinal guide means, wherein said second coupling member is selectively fixable to said longitudinal guide means; and at least one linear thrust member connected with said first coupling member and said second coupling member, wherein said at least one linear thrust member is selectively configurable between a minimum linear extension configuration, wherein said first coupling member and second coupling member are arranged each other at a first distance, and a maximum linear extension configuration, wherein said first coupling member and second coupling member are arranged each other at a second distance larger than said first distance.

Still according to the invention, at least one linear thrust member can comprise at least one hydraulic jack.

Preferably, according to the invention, a plurality of longitudinal holes can be formed in said longitudinal guide means (said first coupling member can comprises a fixing pin, which is movable between an engagement position, wherein said fixing pin engages a hole of said plurality of longitudinal holes, and a disengagement position, wherein said fixing pin is disengaged with said plurality of longitudinal holes.

Advantageously, according to the invention, said moving means can comprise: a first plurality of pulleys connected with said at least a first elongated component; a second plurality of pulleys connected with said at least a second elongated component; at least one rope wrapped on said first plurality of pulleys and said second plurality of pulleys; and at least one pulling device configured to pull said at least one rope such as to move said at least a second elongated component from said retracted position to said extracted position.

Furthermore, according to the invention, said support tower can comprise an anti-falling system which comprise: at least one longitudinal element longitudinally fixed to an inner part of said at least a first elongated component, a plurality of longitudinal holes being formed in said at least one longitudinal element; at least one sliding member, which is fixed to an outer part of said at least a second elongated component and slidably coupled to the at least one longitudinal element; a plurality of pins, each movable between a respective position of engagement with a hole of said plurality of longitudinal holes, and a respective position of disengagement with a hole of said plurality of longitudinal holes; at least one inserting member fixed to said at least one sliding member such that, when said at least one sliding member moves from said retracted position to said extracted position, said at least one inserting member moves, in a sequential way from bottom upwards, pins of said plurality of pins from respective disengagement position to respective engagement position, this preventing said second elongated component from falling when said support tower is vertically arranged.

Still according to the invention said at least one inserting member (comprises a covering layer configured to contact pins of said plurality of pins, said covering layer being made from polyzene.

Preferably, according to the invention, said anti-falling system can comprise a pneumatic removing system configured to pneumatically command movement of pins of said plurality of pins from respective engagement position to respective disengagement position.

BRIEF DESCRIPTION OF THE DRAWINGS

The present invention will be now described, for illustrative, but not limitative purposes, according to its preferred embodiments, with particular reference to the figures of the enclosed drawings, wherein.

DETAILED DESCRIPTION OF THE PREFERRED EMBODIMENTS

In the different figures, similar parts will be indicated by the same reference numbers.

Making now reference to FIGS. 1-16, by reference number 1 it is indicated, as an assembly, a wind system for generation of electric power, i.e. a wind turbine, substantially comprising a foundation base 2, a support tower 3 and a wind generator 4, the latter comprising a series of wind blades 5, in this case namely three blades.

Figure 1:
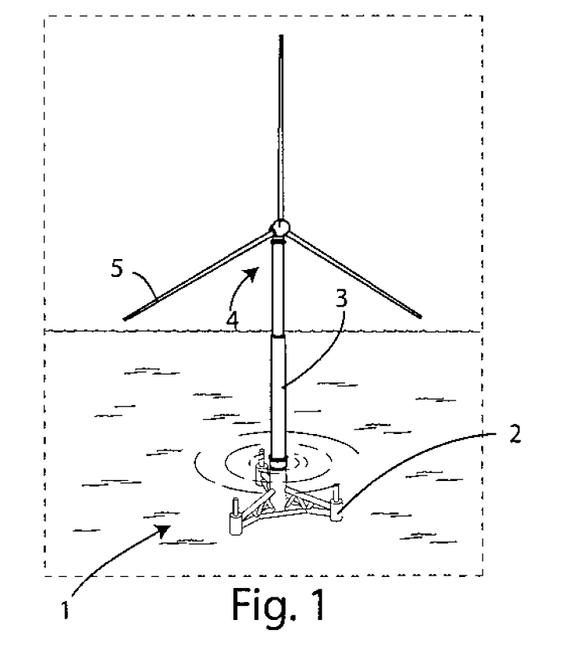
FIG. 1 shows an offshore wind system provided with a foundation structure, a wind generator and a support tower to support the wind generator, according to the present invention, in its extended operative condition.
Figure 2:
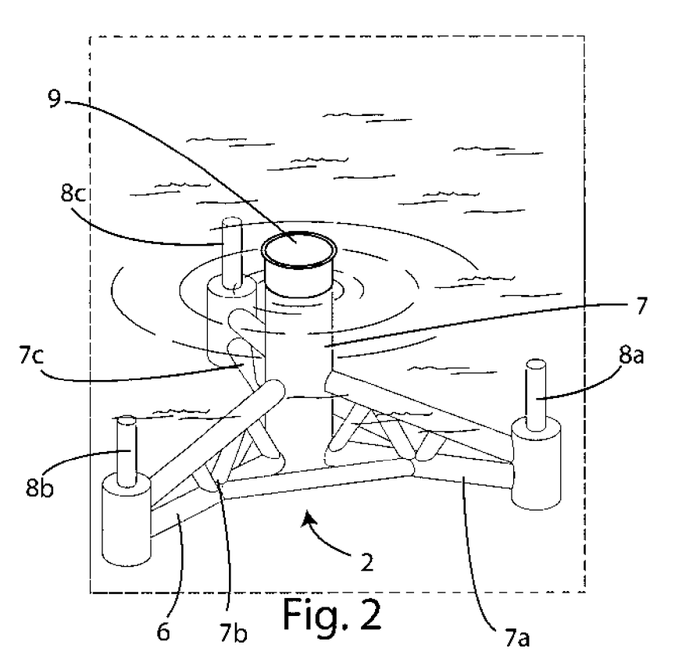
FIG. 2 shows the foundation structure of the wind system shown in FIG. 1, placed on ocean floor.
Figure 3:
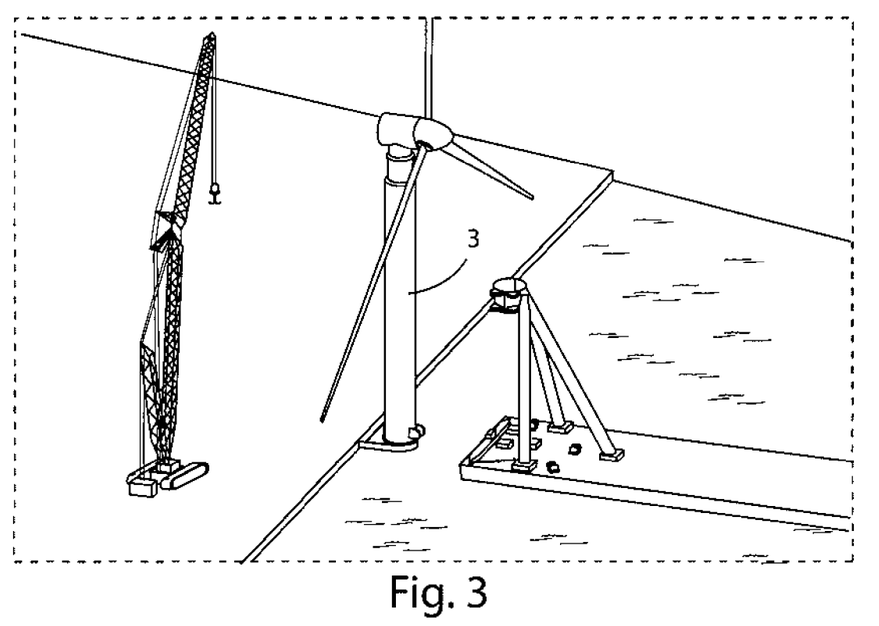
FIGS. 3 and 4 shown two different moments of transfer of the assembly comprised of wind generator and support tower according to the present invention in its retracted configuration, from the taking zone to the ship for transportation to the installation site.
Figure 4:
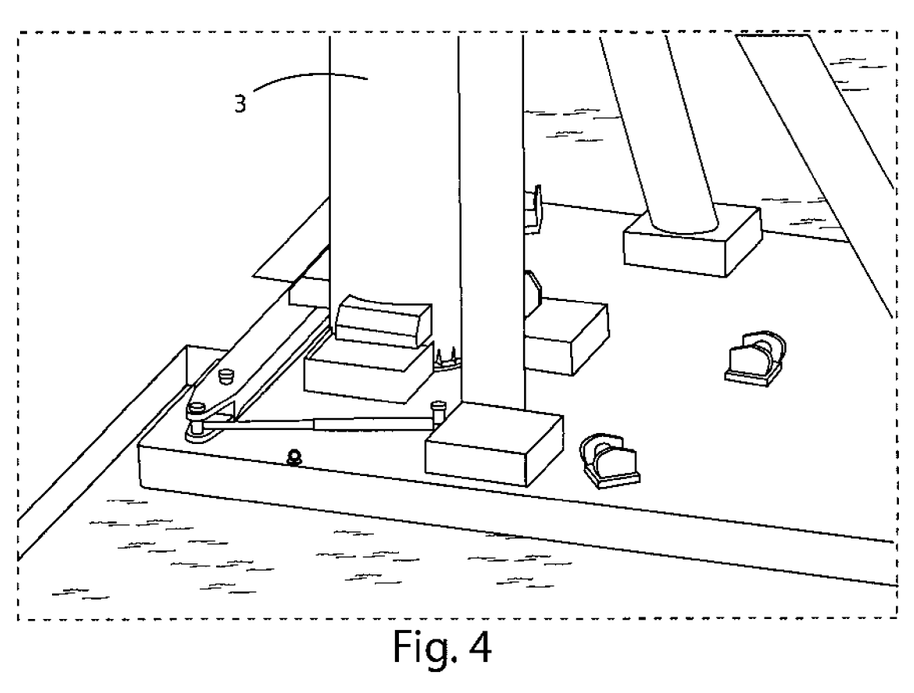
Figure 5:
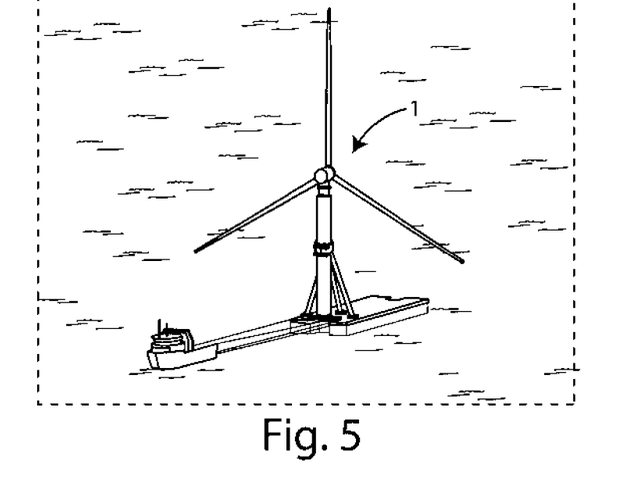
FIG. 5 shows the transportation step of the assembly shown in FIGS. 3 and 4 to the installation site.
Figure 6:
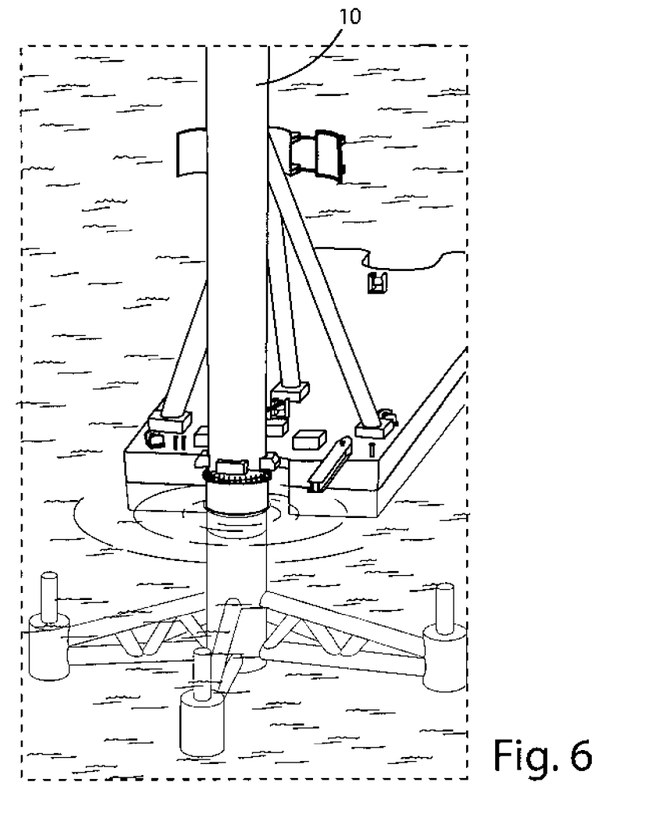
FIG. 6 shows the transportation step of the assembly shown in FIGS. 3, 4 and 5 from the transportation ship above the foundation structure installed before on the ocean floor.
Figure 7:
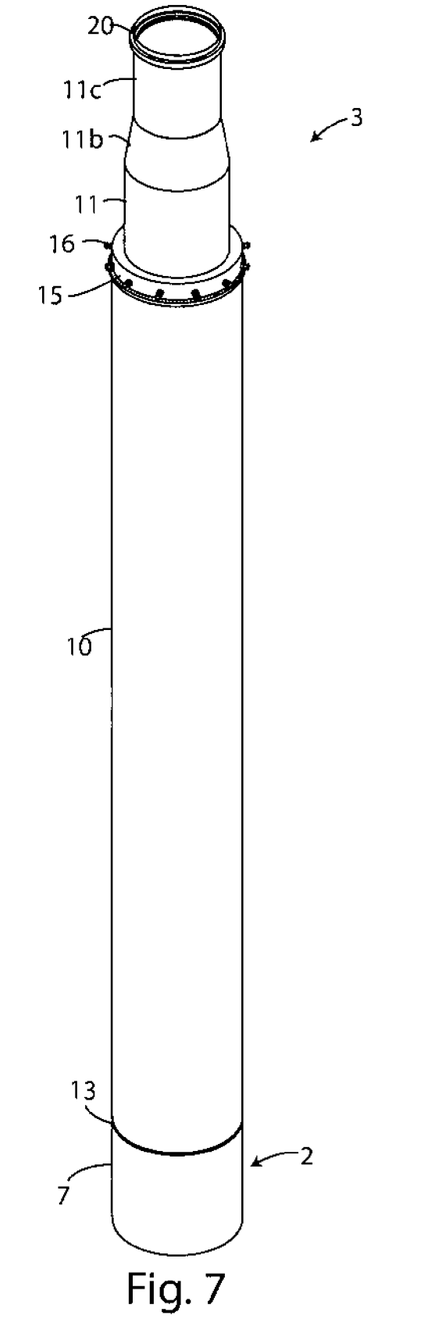
FIG. 7 shows a support tower according to a first embodiment of the present invention, in a retracted configuration.

Foundation base 2 is comprised of a tripod 6, made up of a central tubular element 7, from which three appendixes 7a, 7b, 7c extend, like a rays-assembly, with the relevant tip zones providing three through holes suitable for housing a corresponding number of foundation poles 8a, 8b, 8c.

A first flange 9 is provided at the top of said central tubular element 7, for connection with the support tower 3.

Figure 8:
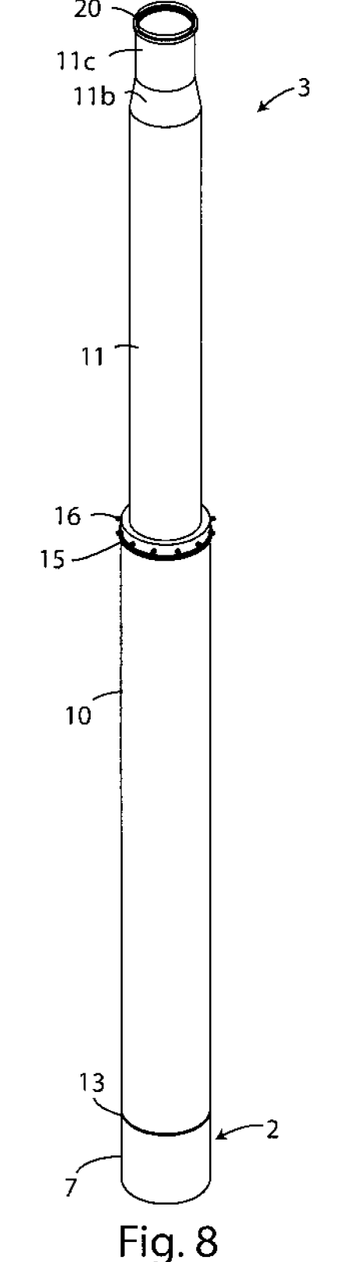
FIG. 8 shows a support tower according to a first embodiment of the present invention, in an extended configuration.

Instead, support tower 3 has a telescopic structure, comprising a lower tubular element 10, having a length of about 60 m, and an upper tubular element 11, having a length of about 70 m, and realised to slide within said lower tubular element 10, so as to be able to move from a maximum retraction position (see FIG. 7) and a maximum extension position (see FIG. 8).

Figure 9:
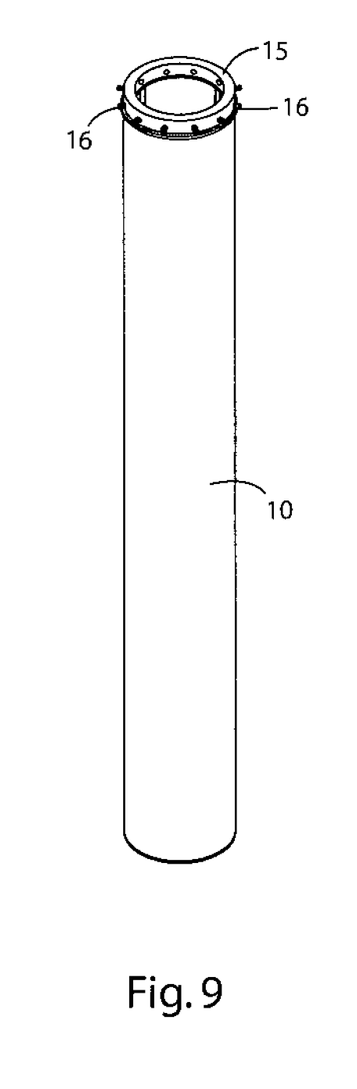
FIG. 9 shows a lower fixed portion of the support tower shown in FIGS. 7 and 8.
Figure 10:
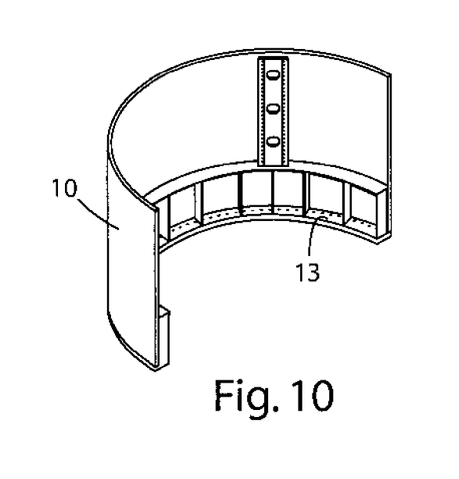
FIG. 10 is a partial cut-away view of a bottom part of the fixed portion shown in FIG. 9.

A second flange 13 is provided in correspondence of the lower end of the lower tubular element 10, having dimensions corresponding to the first flange 9 of the support tower 3, to permit fixing of said lower tubular element 10 to the latter.

On the inner wall of the lower tubular element 10 run, from the bottom to the top of the latter, four longitudinal guides 12a, 12b, 12c, 12d, equidistant each other, i.e. at angular distances of 90° each other, and having a substantially T-shaped transverse profile.

A relevant plurality of holes 14a, 14b, 14c (plurality of holes on longitudinal guide 12d is not shown) is provided on each longitudinal guide 12a, 12b, 12c, 12d.

Figure 11:
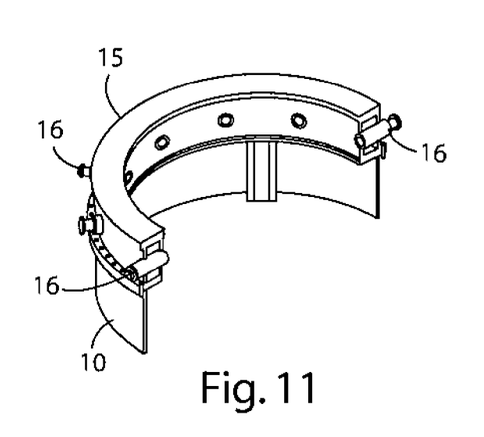
FIG. 11 is a partial cut-away view of a top part of the fixed portion shown in FIG. 9.

Instead, a fixing device 15 having an annular shape is provided at the top of the lower tubular element 10, to permit the fixing of the upper tubular element 11 to the above lower tubular element 10.

Said fixing device is provided with a plurality of hydraulically tightening radial pins 16, movable between a release position, in which they are contained within the structure of the fixing device 15, and a tightening position, wherein they project from said fixing device 15 inward the lower tubular element 10.

Figure 12:
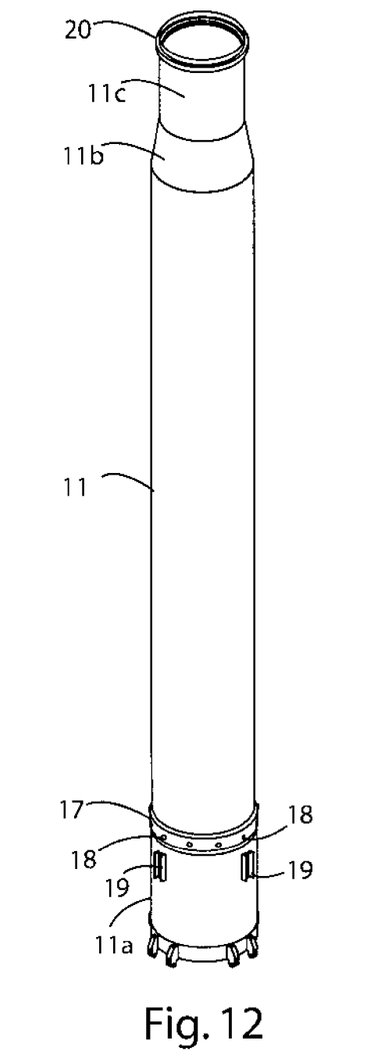
FIG. 12 shows an upper movable portion of the support tower shown in FIGS. 7 and 8.
Figure 14:
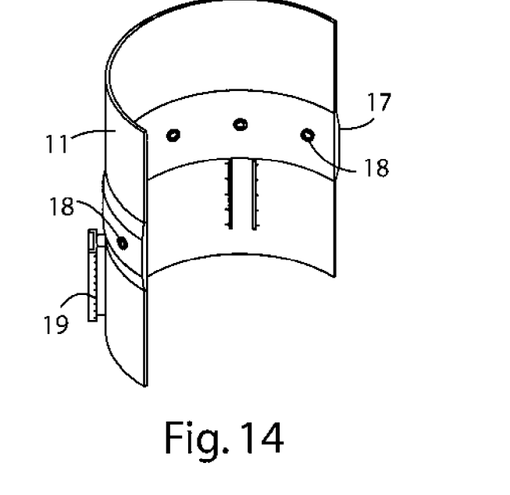
FIG. 14 is a partial cut-away view of a top part of the movable portion shown in FIG. 12.

Instead, a section reducer 11b, comprised of a truncated cone shape tubular portion, an upper tubular portion 11c and a fifth wheel 29, are instead provided on the upper part of said upper tubular element 11, to permit connection of wind generator 4 to the top of the upper tubular element 11.

Figure 13:
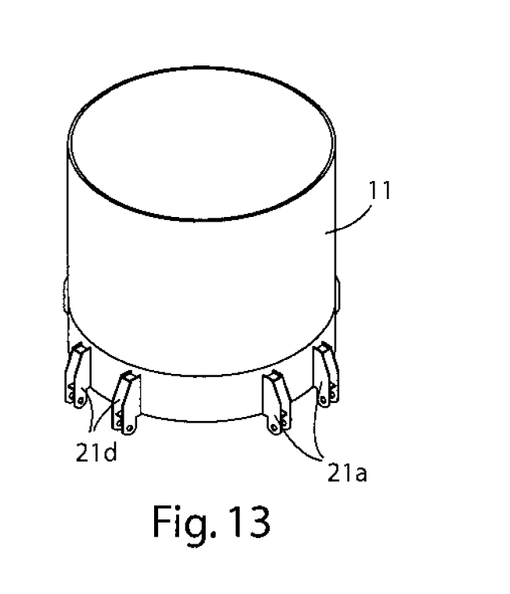
FIG. 13 is a partial cut-away view of a bottom part of the movable portion shown in FIG. 12.

A connection ring 17 is further provided within the upper tubular element 11, on which a plurality of holes 18, circumferentially provided about said connection ring 17 and sized to receive said tightening radial pins 16, when in the relevant tightening position.

A tubular portion 11a of a set length is provided between the connection ring 17 and the lower end of the upper tubular element 11, suitable for promoting stability and aligning said upper tubular element 11, when in the maximum extension position, with respect to the lower tubular element 10.

Figure 15:
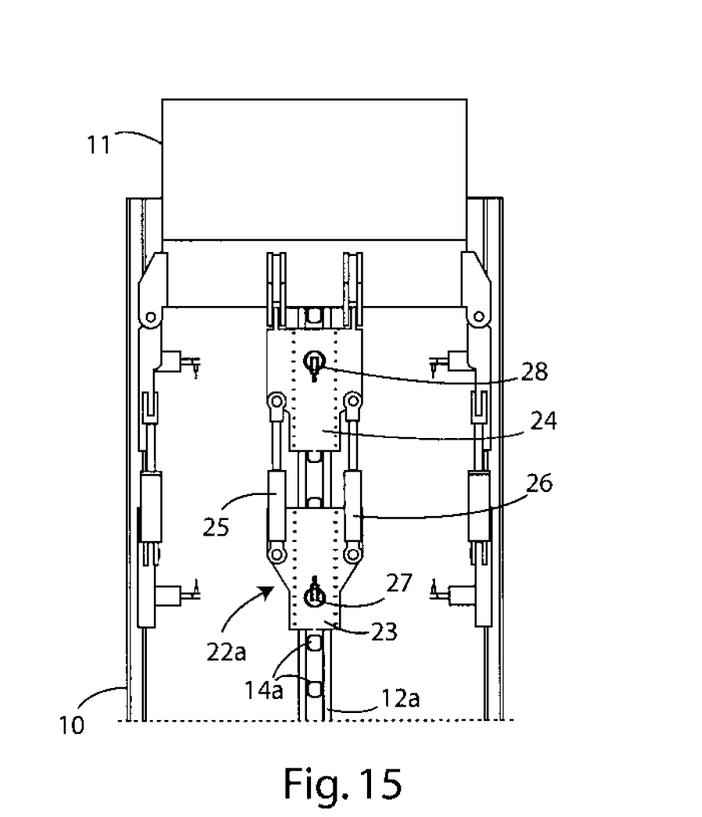
FIG. 15 is a section view of a region of the support tower shown in FIGS. 7 and 8, wherein the fixed portion and the movable portions overlap each other.

Four abutment elements 19 are fixed on the outer surface of the tubular portion 11a, placed at 90° each other and so configured to sliding coupling with above longitudinal guides 12a, 12b, 12c, 12d of the lower tubular element 10.

Four pairs of eyebolts 21a, 21d (the other two pairs are not shown in the figures) are fixed in correspondence of the lower edge of the upper tubular element 11, provided at 90° each other and respectively aligned with respect to said abutment elements 19.

Figure 16:
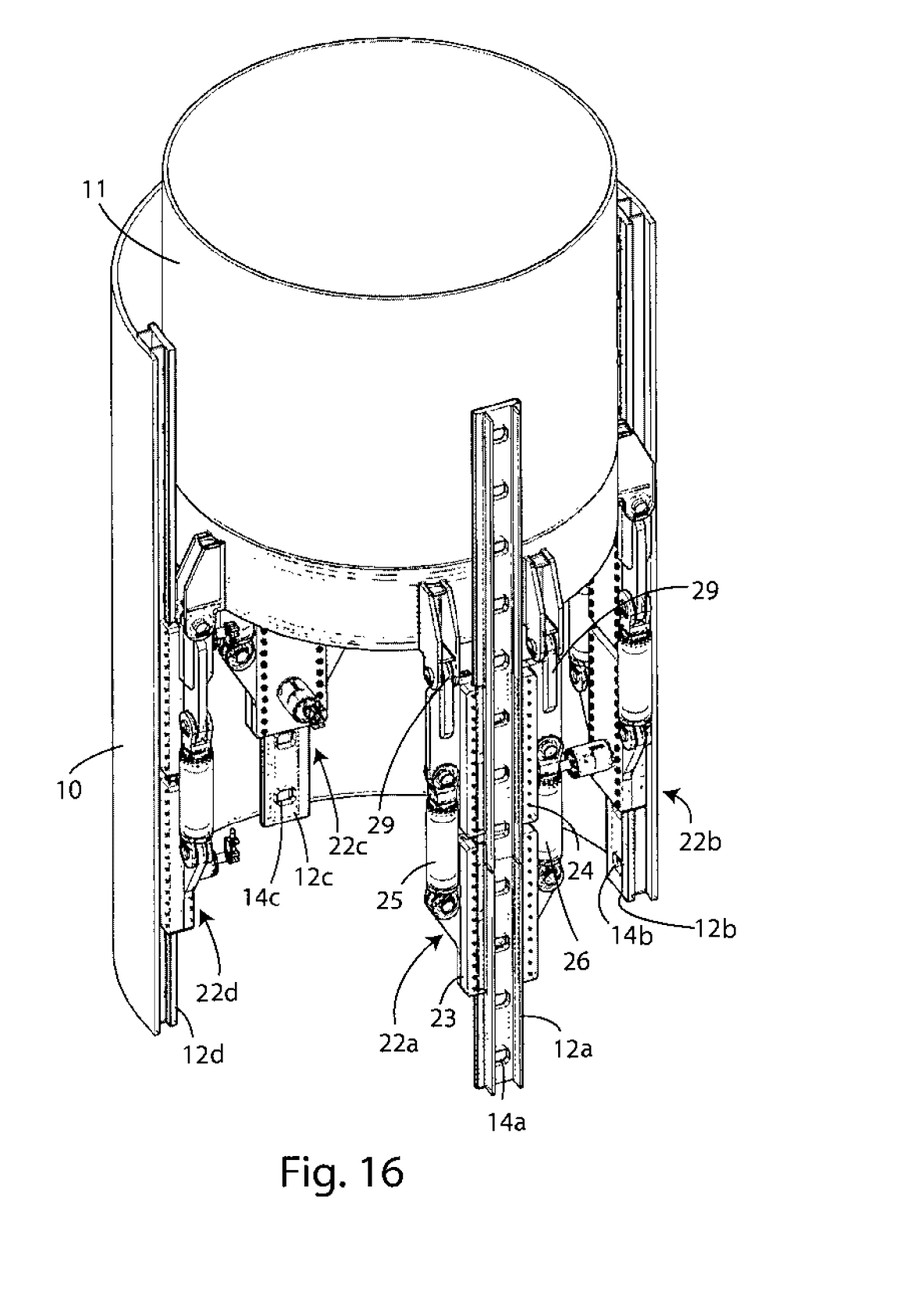
FIG. 16 is a cut-away view of the region shown in FIG. 15.

Support tower 3 comprises four lifting devices 22a, 22b, 22c, 22d, under the upper tubular element 11 and respectively connected to said four pairs of eyebolts by relevant hinges.

Each lifting device 22a, 22b, 22c, 22d comprises lower plate 23 and an upper plate 24, both having a substantially "C" shaped cross section, so as to embrace a relevant longitudinal guide 12a, 12b, 12c, 12d, being always slidable with respect to the same.

A first hydraulic jack and a second hydraulic jack 26 are further provided in each lifting device 22a, 22b, 22c, 22d, which are connected each other and linked to said lower plate 23 and to said upper plate 24.

A lower blocking member 27 and an upper blocking member 28 are respectively provided in said lower plate 23 and upper plate 24, provided with relevant selectively movable connection pins, by a control system, between a disengagement position and an engagement position, with through holes realised in the above longitudinal guides, so that, when a connection pin is in the engagement position, relevant plate is rigidly connected with the relevant longitudinal guide, and that, when said connection pin is in the disengagement position, relevant plate can freely slide along the relevant longitudinal guide.

An upper pair of eyebolts 19 projects from the top of the upper plate 24, configured to be coupled, by hinges, with one of said pairs of eyebolts 21a, 21d provided in the upper tubular element 11.

To install the wind system 1 offshore, it is preliminarily necessary anchoring said foundation base 2 to the ocean floor by sinking of foundation poles 8a, 8b, 8c within the ground.

After sinking of said poles, levelling of foundation base 2 is carried out, by an oleo-dynamic jack system.

After having checked vertical position of foundation base 2, relevant cemetation is carried out.

Then, assembly comprising support tower 3 and wind generator 4, with its wind blades 5, assembled beforehand with the yard, is transported, by suitable shipping means and with the support tower 3 vertically provided in its maximum retraction configuration (see FIGS. 3, 4 and 5), to the installation site, where fixing operation of the lower tubular element 10 onto first flange 9 of foundation base 2 projecting from the water free surface is carried out.

Once fixed the support tower 3 onto the foundation base 2, elevation of the latter is started, activating said four lifting devices 22a, 22b, 22c, 22d, after having first deactivated the fixing device 15.

Said lifting devices 22a, 22b, 22c, 22d have a "step-by-step" operation, thus permitting raising of upper tubular element 11 from maximum retraction configuration to maximum extension configuration by subsequent raising steps, each step providing a linear stroke of about 1 mm.

More specifically, each raising step provides, ins sequence, fixing of each upper plate 24 to the relevant longitudinal guide, by activating the upper blocking member 28, compression of relevant jacks 25, 26 from their maximum expansion configuration with consequent rising of lower relevant plate 23.

Now, when said jacks 25, 26 are in their compressed configuration, lower plate 23 of each lifting device 22a, 22b, 22c, 22d is fixed to the relevant longitudinal guide, by activating the lower blocking member 27.

Then, the upper plate 24 of each lifting device 22a, 22b, 22c, 22d is disengaged from the relevant longitudinal guide, by deactivation of the upper blocking member 28, and extension of jacks of lifting device is controlled, thus raising the upper plate 24.

Thus, repeating different times the above operative steps of each rising step, support tower 3 will gradually pass from the maximum retraction configuration to the maximum extension configuration.

Once the support tower 3 is in its maximum extension configuration, taking the wind generator 4 and the relevant wind blades 5 at the design height, activation of the fixing device 15 is realised, and thus blocking of the upper tubular element 11 on the lower tubular element 10.

Thus, when the upper tubular element 11 is in its maximum extraction configuration with respect to the lower tubular element 10, support tower 3 reaches a total height of about 130 m on the water free surface, thus permitting the use of very long wind blades 5.

Figure 17:
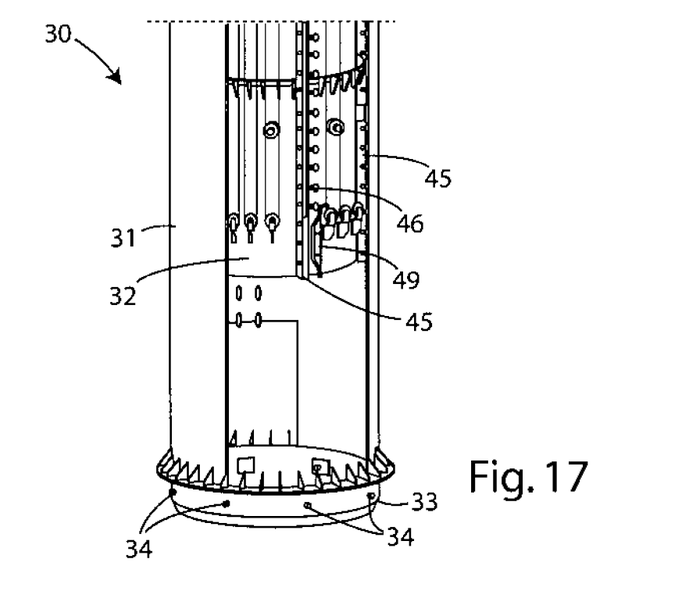
FIG. 17 is a partial view of a support tower according to a second embodiment of the present invention, in an initial step of its in situ installation.
Figure 18:
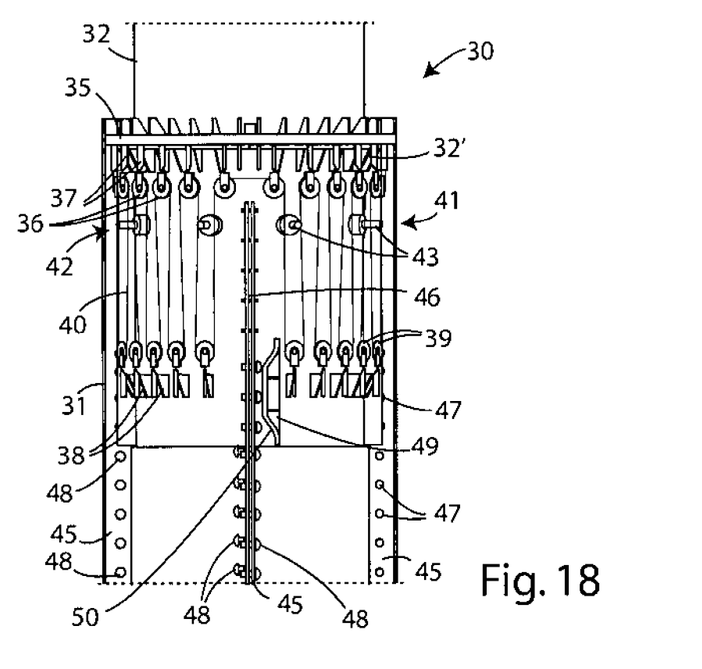
FIG. 18 is a partial view of a support tower according to a second embodiment of the present invention, in the final step of its in situ installation.

Making now specific reference to FIGS. 17 and 18, by reference number 30 it is indicated a support tower according to a second embodiment of the present invention, for a wind generator (not shown), in a wind turbine.

Also in this case, support tower 30 is comprised of a fixed lower tubular element 31 and of a movable upper tubular element 32, sliding connected with said lower tubular element 31, more specifically by a telescopic coupling.

A coupling flange 33 is provided at the base of the lower tubular element 31 to permit coupling with a foundation base (not shown) already fixed to the ocean floor.

Coupling flange 33 is provided with a plurality of pins 34, radially provided about said coupling flange 33 and movable between a retracted release position and an extracted coupling position, wherein flange 33 is fixedly coupled with a corresponding flange of the foundation base.

An annular flange 35 is fixed on the top of the lower tubular element 31, within which the upper tubular element 32 is movably provided.

A first plurality of pulleys 36 is provided on the lower portion of the annular flange 35, circumferentially and each one linked on a relevant support element 37, projecting below the above annual flange 35.

In correspondence of the lower part of the movable upper tubular element 32 it is instead provided a plurality of support brackets 38, circumferentially placed about said upper tubular element 32.

A pulley of a second plurality of pulleys 39 faced upward is linked on each bracket of said plurality of support brackets 38.

A steel cable 40 is wound around the first plurality of pulleys 36 and the second plurality of pulleys 39, with its ends connected to a lifting which (not shown), provided in correspondence of the base of the support tower 30.

As an alternative, said winch could be installed on barge for transportation of support tower 30 to the sea site of its installation.

A positioning flange 32' is mounted in correspondence of the lower part of the upper tubular element 32, suitable for abutting and coupling with the annular flange 35 of the lower tubular element 31 when the above upper tubular element 32 is provided in its maximum extraction position.

A blocking system 41 is further provided on the lower portion of the upper tubular element 32, suitable for blocking each other lower tubular element 31 and upper tubular element 32, when the latter is in its maximum extraction position with respect to the lower tubular element 31.

Blocking system 41 is comprised of a plurality of tightening hydraulic devices 42, placed along a circumference within the upper tubular element 32.

Each tightening hydraulic device 42 comprises a tightening pin 43, connected to a hydraulic control system that can hydraulically control its movement between a release retracted position and a blocking extracted position.

Particularly, said blocking system 41 operates in such a way that, when the upper tubular element 32 is in its maximum extracted position and displacement of relevant tightening pins is input, from their retracted position to the extracted position, the latter are in a position to engage each one a corresponding seat realised on the inner wall of the lower tubular element 31, thus causing blocking each other of upper tubular element 32 and of lower tubular element 31.

Support tower 30 also provides a safety system 44, aimed at preventing falling downward of the upper tubular element 32 during the lifting step of the latter from the maximum retraction position to the maximum extraction position.

Said safety system 44 comprises four pairs of plates 45, having a guiding function, fixed to the inner wall by the lower tubular element 31, and developing almost all along the longitudinal extension of the latter.

Said four pairs of plates 45 are provided each other at angular distances of 90°.

Each one of said pairs of plates 45 defines, between two adjacent plates, a slot, along which a sliding plate 46 can slide, fixed to the outer portion of the lower tubular element 31, under the positioning flange 32'.

Sliding coupling among the four sliding plates 46 and relevant pairs of plates 45, besides guiding rising movement of the upper tubular element 32, permits preventing rotation each other between the latter and the lower tubular element 31.

Two corresponding pluralities of longitudinal holes 47 are obtained on two plates of each pair of plates, so that pairs of holes, coaxial each other, are obtained on each pair of plates 45.

An anti fall pin 48 is aligned with each pair of holes, said pin being movable between a disengagement position, wherein it does not occupy relevant pair of holes, and an engagement position, wherein it occupies the relevant pair of holes.

Said safety system 44 further comprises four insertion members 49, fixed at the base of the upper tubular element 32 in positions under the four sliding plates 46 and having a shaped profile faced toward the anti fall pins 48 heads.

Particularly, said shaped profile of each insertion member 49 has a substantially rectilinear central part, with two curved outer parts so as to gradually depart from said central part.

Further, each insertion member 49 is coated, on the shaped profile side, by a polyzene layer 50, in order to reduce friction between said insertion member 49 and the anti fall pins 48 heads.

To install the support tower 30, it is necessary, also in this case, transporting it to the installation site as described in the above with reference to support tower 3, and connecting the same to the connection flange of the foundation base, fixed beforehand to the ocean floor.

Once fixed the support tower 30 to the relevant foundation base, it is raised by activating said lifting which, the latter pulling the cable 40 and causing progressive reduction of cable 40 parts between said first plurality of pulleys 36 and said second plurality of pulley 39, and thus progressive rising of the upper tubular element 32 up to abutment between positioning flange 32 and annular flange 35 of the lower tubular element 31.

While upper tubular element 32 moves upward, thanks to the pulling action exerted by said winch, four insertion members 49 sequentially push anti fall pins 48 within holes realised into four pairs of plates 45, so that, in case the cable 40 fails, upper tubular element 32 fall is blocked by four sliding plates 46 and relevant four anti fall pins 48 inserted within the latter.

Once the positioning flange 320' of the upper tubular element 32 abuts against the annular flange 35 of the lower tubular element 31, blocking system 41 is activated to block the upper tubular element 32 in its maximum extraction position.

To bring back the support tower 30 from its maximum extraction configuration to the maximum retraction configuration, it is instead necessary activating a suitable pneumatic system provided with suitable ducts in communication with said anti fall pins 48.

When working, the above pneumatic system produces, by input of suitable compressed air pulses, sequential extraction, from top to bottom, of anti fall pins (48) from relevant holes, and thus progressive lowering of upper tubular element 32.

According to further embodiments of the present invention, not shown in the enclosed claims, the support tower can comprise, in lieu of lower 10, 31 and upper 11, 32 tubular elements described in the above, three or more tubular elements, telescopically coupled each other.

The present invention has been described for illustrative, but not limitative, purposes, according to its preferred embodiments, but it is to be understood that variations and/or modifications can be introduced by those skilled in the art without departing from the relevant scope as defined in the enclosed claims.

The invention claimed is:

1. A support tower, particularly for a wind turbine, wherein said support tower comprises:
   at least a first elongated component, which is internally hollow;
   at least a second elongated component, which is slidably coupled to said at least first elongated component and movable relative to said at least first elongated component at least between a retracted position, where said second elongated component is at least partially inserted in said at least first elongated component, and an extracted position, where said at least second elongated component is substantially extracted from said at least first elongated component;
   moving means for moving said second elongated component from said retracted position to said extracted position, and vice versa;
   blocking means configured to allow said at least second elongated component to be blocked in said extracted position, comprising a plurality of pins arranged between said at least first elongated component and said at least second elongated component and selectively movable between a disengagement position, wherein said at least second elongated component is movable relative to said at least first elongated component, and an engagement position, wherein said at least second elongated component is fixed relative to said at least first elongated component;
   at least one longitudinal element for guiding motion of said at least a second elongated component between said retracted position and said extracted position and for preventing reciprocal rotation of said at least a second elongated component and said at least a first elongated component; and
   an anti-falling system which comprises:
   said at least one longitudinal element longitudinally fixed to an inner part of said at least first elongated component, a plurality of longitudinal holes being formed in said at least one longitudinal element;
   at least one sliding member, which is fixed to an outer part of said at least second elongated component and slidably coupled to said at least one longitudinal element;
   a plurality of pins, each movable between a respective position of engagement with a hole of said plurality of longitudinal holes, and a respective position of disengagement with a hole of said plurality of longitudinal holes;
   at least one inserting member fixed to said second at least elongated component and under said at least one sliding member such that, when said at least one sliding member moves from a retracted position to an extracted position, said at least one inserting member sequentially moves pins of said plurality of pins from respective disengagement position to respective engagement position, so as to prevent said at least second elongated component from falling when said support tower is vertically arranged.

2. The support tower according to claim 1, wherein said moving means comprise:
   a first plurality of pulleys connected with said at least first elongated component;
   a second plurality of pulleys connected with said at least second elongated component;
   at least one rope wrapped on said first plurality of pulleys and said second plurality of pulleys; and
   at least one pulling device configured to pull said at least one rope such as to move said at least second elongated component from said retracted position to said extracted position.

3. The support tower according to claim 1, wherein said at least one inserting member comprises a covering layer configured to contact pins of said plurality of pins, said covering layer being made from polyzene.

* * * * *